J. WARRINGTON.
RAILWAY AIR COUPLING.
APPLICATION FILED DEC. 15, 1910.
997,875.
Patented July 11, 1911.
2 SHEETS—SHEET 1.
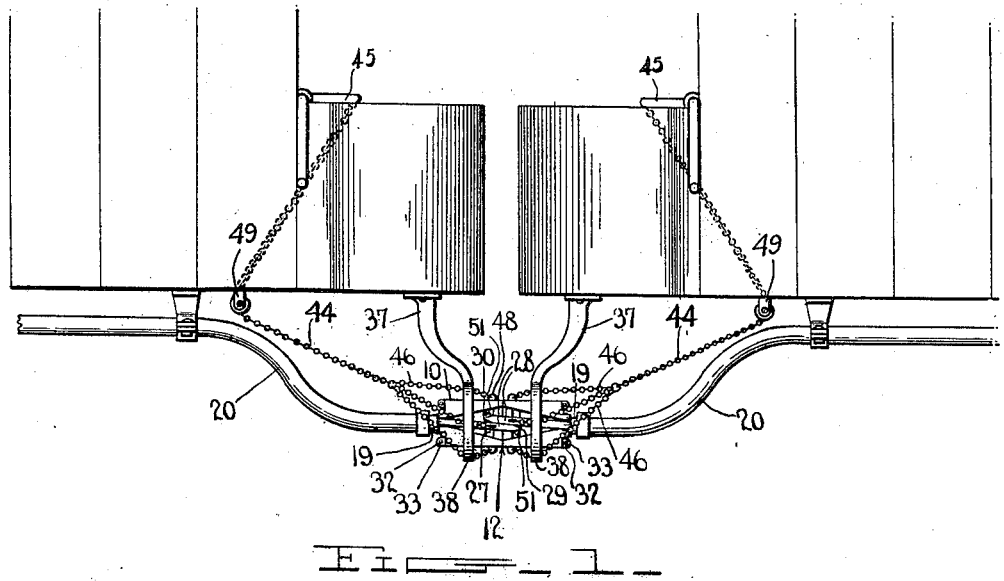
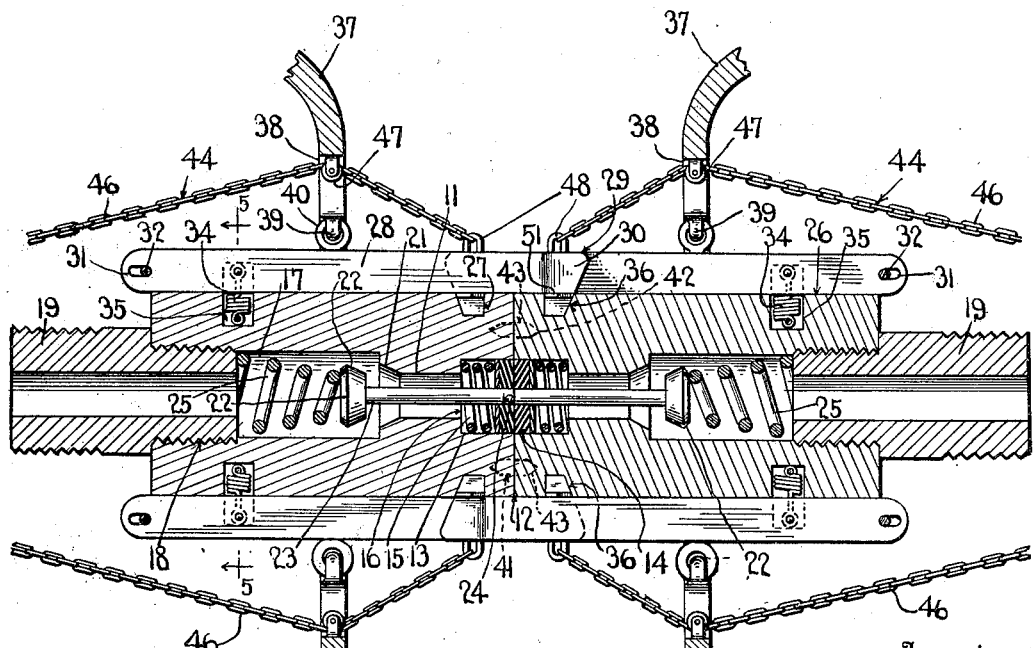
Witnesses
L. B. James
Francis Boyle
Inventor
Joshua Warrington
By Chandler & Chandler
Attorneys

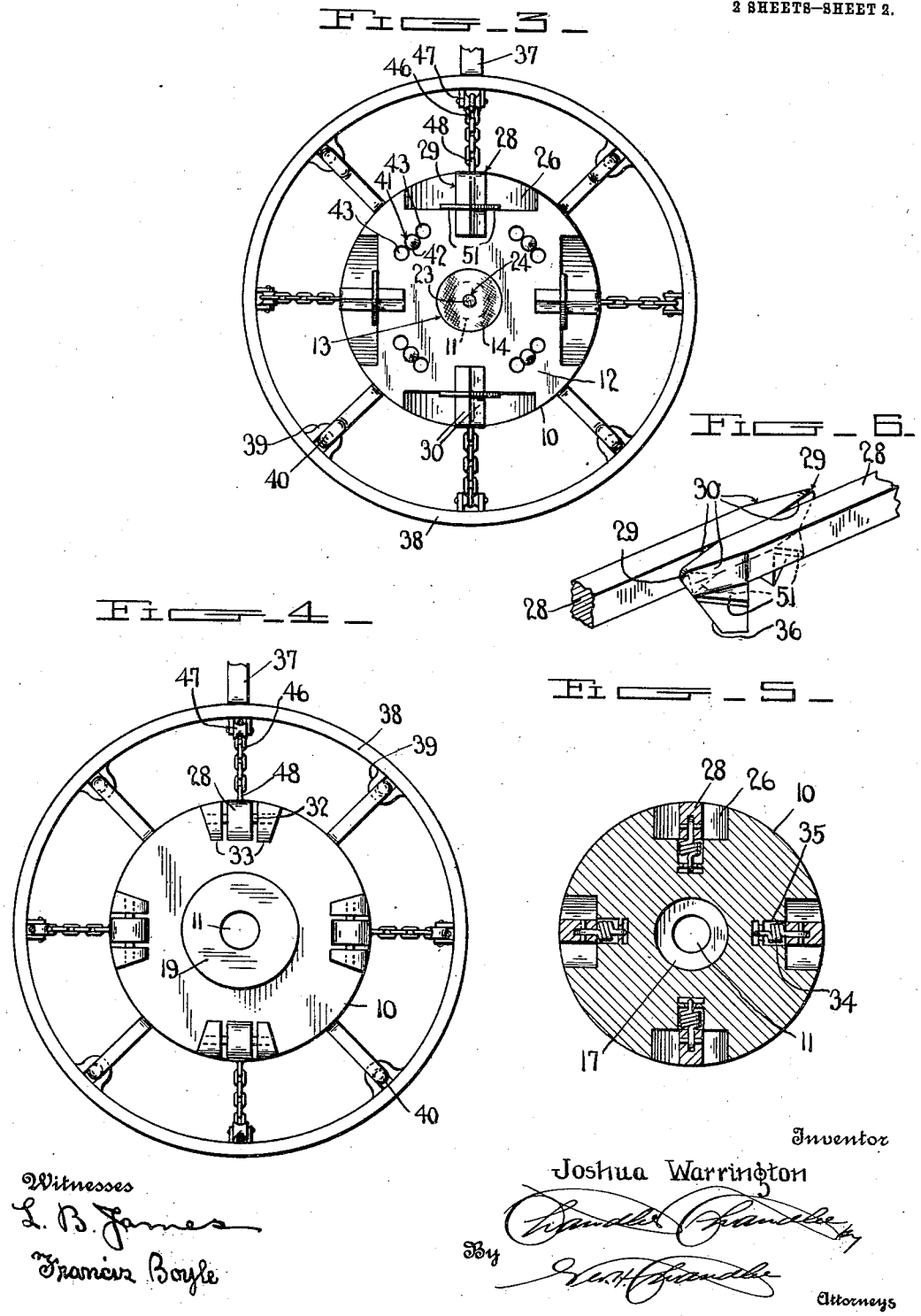

UNITED STATES PATENT OFFICE.

JOSHUA WARRINGTON, OF LAMBERT, MISSISSIPPI.

RAILWAY AIR-COUPLING.

997,875.  Specification of Letters Patent.  Patented July 11, 1911.

Application filed December 15, 1910. Serial No. 597,463.

*To all whom it may concern:*

Be it known that I, JOSHUA WARRINGTON, a citizen of the United States, residing at Lambert, in the county of Quitman, State of Mississippi, have invented certain new and useful Improvements in Railway Air-Couplers; and I do hereby declare the following to be a full, clear, and exact description of the invention, such as will enable others skilled in the art to which it appertains to make and use the same.

This invention relates to automatic couplers for railway air hose and has for its object to provide a coupler that will be sufficiently flexible to adapt itself to the movements of a train advancing over an uneven road bed.

A further object of the invention is to provide a coupler that will automatically lock together confronting ends of the air hose that are not in alinement.

A still further object is to provide a coupler that may be released without the brakeman stepping between the coaches, and will automatically couple when the coaches are coupled together without attention from the brakeman.

With the above object in view the invention consists of the novel details of construction and combination of parts hereinafter fully described and claimed, it being understood that various modifications may be made in the minor details of construction within the scope of the appended claims.

In the accompanying drawing forming part of this specification, Figure 1 is a view in side elevation showing the air hose of two coaches coupled by my improved coupler. Fig. 2 is a longitudinal sectional view through two mating couplers in locked position. Fig. 3 is an enlarged view in elevation of the bumper face of the coupler. Fig. 4 is a view in elevation of the rear end face of the coupler. Fig. 5 is a cross sectional view taken on the line 5—5 Fig. 2. Fig. 6 is a detail perspective view showing clutch fingers of two confronting couplers in locked position.

Referring now to the drawing in which like characters of reference designate similar parts, the coupler is shown to consist of a cylindrical body 10 having an internal longitudinal air passage 11, which opens out into the bumper face 12, of the body in an enlarged mouth 13 which seats a yielding packing element 14 such as rubber or the like, a helical spring 15 being seated in the mouth in rear of the packing element and being terminally secured to the shoulder 16 of the mouth and to the shoulder confronting face of the packing element, this spring serving to maintain the packing element in abutting contact with the similar packing element of the mating coupler and preventing leakage of air.

The passage opens out into the rear end face of the body in an enlarged cylindrical mouth 17 the outer end of which is threaded as shown at 18 and receives a threaded nipple 19 carried upon the end of the air hose 20 of the coach. That portion of the air passage opening out into the mouth 17 is formed frusto-conical in outline as shown at 21 and forms a seat for a valve 22 the stem 23 of which projects axially through the passage and is slidingly fitted in an axial opening 24 formed in the packing element, this stem projecting considerably beyond the packing element when the coupler is disengaged from the mating coupler, and being held in this position through the instrumentality of a helical spring 25 that bears with its opposite terminal convolutions against the valve 22 and air hose nipple 19, this spring serving to hold the valve in its seat 21 and prevent escape of air. The stem is driven rearwardly carrying the valve out of its seat against the pressure of the spring by the projecting end of the valve stem in the mating coupler to open the valve when the couplers are in engaged position as shown in Fig. 1.

Formed in the periphery of the body 10 is a series of V-shaped recesses 26, having their apexes opening out through the rear face of the body and their bases opening out through the bumper face of the body. Formed in the floor of each recess is a transversely disposed groove 27, the groove being arranged adjacent to the bumper face of the body.

A clutch finger 28 is mounted in each groove, the forward end of the finger projecting considerably beyond the bumper face of the body and terminating in a hook 29 the side faces of which are beveled to form cam surfaces 30 the object of which will presently appear. The clutch finger projects beyond the rear face of the body and is equipped with a longitudinal slot 31 which receives a pivot pin 32 carried by a pair of lugs 33 arranged on opposite sides of the projecting end of the finger. By virtue of the slot the finger may be rocked outwardly from the periphery of the body and may also have a limited angular movement within the coupling recess and at right angles to the first named movement. A helical spring 34 situated in a radial socket 35 formed in the floor of the recess and midway between the sides of the recess, holds the clutch finger snugly against the floor of the recess.

By virtue of the cam faces 30 on the end of each clutch finger, when the bumper faces of mating couplers impinge one against the other, should the couplings not be in horizontal alinement the clutch fingers will upon contact veer off from each other, and by virtue of the loose mountings of the fingers, overlap and engage the opposite coupling body. It will here be stated that the common edge 36 of the cam faces inclines in the direction of the bumper face of the body and acts as a cam edge to direct the finger upwardly over the edge of the bumper face of the mating coupler when the mating coupler is out of vertical alinement. It will thus be seen when the couplings are out of alinement that the clutch fingers will be flexible enough to overlap and engage in the locking notches 27 without danger of becoming snapped off as the bumper faces of the couplers collide. It will now be explained how the locked couplers are flexibly mounted to conform to movement of the coupled coaches in rounding curves and on grades.

Fixed to any convenient portion of the coach is a hanger 37 that terminates at its lower end in a ring 38, this ring being equipped on its inner periphery with a plurality of eyes 39 which loosely receive eyes 40 fixed to the periphery of the coupler body. The coupler body is thus loosely mounted on the ring. When the abutting coupler bodies are locked in alinement as will presently be explained, by virtue of the loose connections between the coupler bodies and the bracket rings, and also by virtue of the flexibility of the air hose, the locked couplers may conform to relative movement of the coaches.

For locking mating couplers positively together and in alinement, a plurality of forwardly projecting lugs 41 are fixed to the bumper face of the coupler body, these lugs having pointed cam ends 42. The lugs of mating couplers impinge the one against the other and by virtue of the cam points of the lugs veer off from each other and engage in sockets 43 formed adjacent the roots of the corresponding lugs. These sockets are preferably two in number as clearly shown in Fig. 3 and the cam points of the lugs are so formed as to direct the lugs into the sockets and when the lugs are so engaged the coupling bodies are positively locked in alinement so that escape of air is prevented.

For releasing the clutch fingers a chain or similar flexible connector 44 is secured to the coupling pin release rod 45 of the car and is provided at its opposite end with a plurality of branches 46 which are trained over sheaves 47 mounted upon the inner periphery of the hanger ring, and are terminally connected as shown at 48 to the free ends of the clutch fingers of the body. The chain is trained over a sheave 49 fixed to the car bottom, and by virtue of being secured to the coupling pin release rod, when the latter is actuated to withdraw the coupling pin the chain will be pulled, and it is obvious that as the coupling pin release rod terminates in a crank which the brakeman operates from the side of the car, the clutch fingers may be released without the brakeman stepping between the coaches to perform this operation.

In order that when one of the chains is pulled the simultaneous release of all the clutch fingers of both locked couplers may be effected, each clutch finger is provided adjacent to its hook with a pair of triangular wings 51, these wings being arranged one on either side face of the finger and having their bottom faces flush with the bottom face of the finger. One of the wings engages underneath the bottom face of the mating finger on a confronting coupler and when moved outwardly by the pull chain 44 operates to move outwardly the mating finger. By virtue of the triangular shape of the wings, as the coaches move apart, the hooks of the overlapping mating fingers will ride off laterally from the edges of the wings so that disengagement of the fingers is effected without breaking off of the wings.

What is claimed, is:—

1. A coupler including a body having an internal passage, a plurality of forwardly projecting clutch fingers mounted externally on said body, loose connections between said body and fingers, permitting of said fingers rocking outwardly and laterally relatively to the longitudinal axis of said body, said body having locking notches underlying and projecting beyond the sides of said fingers, and a locking lug on the bumper face of said body having a cam point for engaging the bumper face of a mating coupling and positioning the clutch fingers thereof to engage said locking notches on either side of the corresponding fingers of said body.

2. A coupling including a body having an internal valve controlled passage, a plurality of forwardly projecting clutch fingers loosely mounted externally of said body, and rockable outwardly and laterally relatively to the longitudinal axis of said body, said body having locking notches underlying and projecting beyond the sides of said fingers, a cam locking stud on the bumper face of said body for engaging the bumper face of a mating coupling and positioning the clutch fingers thereof to engage said locking notches on either side of the corresponding fingers of said body, and lateral wings on said fingers engaging under said mating coupling fingers and releasing the same from said locking notches simultaneously with the outward rocking movement of the fingers of said body.

3. A coupling including a body having an internal longitudinal valve controlled passage, and provided with externally substantially V-shaped recesses having their apexes directed rearwardly, each recess having a transverse locking groove at its forward end, a spring pressed clutch finger in each recess projecting forwardly beyond said body, a loose connection between said body and each clutch finger permitting of the finger swinging outwardly from said body, and laterally in said recess, and a locking stud on the bumper face of said body having a cam point adapted for glancing contact with a similar stud on the bumper face of a mating coupling, said body having sockets adjacent the root of said stud for the reception of said mating coupler stud whereby to position said mating coupler in alinement with said body.

In testimony whereof, I affix my signature, in presence of two witnesses.

JOSHUA WARRINGTON.

Witnesses:
D. L. READ,
W. J. GEE.

Copies of this patent may be obtained for five cents each, by addressing the "Commissioner of Patents, Washington, D. C."